United States Patent
Sayeedi (10) Patent No.: US 8,509,777 B2
(45) Date of Patent: Aug. 13, 2013

(54) METHOD AND APPARATUS FOR SUPPORTING A NETWORK INITIATED HANDOVER IN A WIRELESS NETWORK

(75) Inventor: Shahab M. Sayeedi, Naperville, IL (US)

(73) Assignee: Motorola Mobility LLC, Libertyville, IL (US)

( * ) Notice: Subject to any disclaimer, the term of this patent is extended or adjusted under 35 U.S.C. 154(b) by 743 days.

(21) Appl. No.: 12/400,056

(22) Filed: Mar. 9, 2009

(65) Prior Publication Data

US 2009/0233604 A1 Sep. 17, 2009

Related U.S. Application Data

(60) Provisional application No. 61/036,573, filed on Mar. 14, 2008.

(51) Int. Cl.
*H04W 36/00* (2009.01)

(52) U.S. Cl.
USPC ........ 455/436; 455/437; 455/438; 455/432.1; 455/407; 455/408; 370/331

(58) Field of Classification Search
USPC ....... 455/436–438, 432.1, 407–408; 370/331
See application file for complete search history.

(56) References Cited

U.S. PATENT DOCUMENTS

| | | | |
|---|---|---|---|
| 5,790,954 A * | 8/1998 | Tayloe et al. | 455/437 |
| 2005/0094600 A1 | 5/2005 | Zhang et al. | |
| 2007/0015510 A1 * | 1/2007 | Xiang | 455/436 |
| 2007/0249347 A1 * | 10/2007 | Saifullah et al. | 455/436 |
| 2007/0258407 A1 * | 11/2007 | Li et al. | 370/331 |
| 2008/0039090 A1 * | 2/2008 | Jin et al. | 455/436 |
| 2008/0192700 A1 * | 8/2008 | Lee et al. | 370/331 |
| 2008/0287129 A1 * | 11/2008 | Somasundaram et al. | 455/436 |
| 2008/0299973 A1 | 12/2008 | Sayeedi | |
| 2009/0312021 A1 * | 12/2009 | Kim | 455/436 |

FOREIGN PATENT DOCUMENTS

| | | |
|---|---|---|
| EP | 0504122 B1 | 7/1998 |
| EP | 1120985 A1 | 8/2001 |
| WO | 2004064294 A2 | 7/2004 |

OTHER PUBLICATIONS

WiMAX Forum Network Architecture—Stage 3—Detailed Protocols and Procedures—Release 1.1.2, Nov. 8, 2007, copyright 2005-2007 WiMAX Forum, Section 4.7.2.1.6.
P802.16REV2/D1, Draft Standard for Local and metropolitan area networks, Part 16: Air Interface for Broadband Wireless Access Systems, P802.16Rev/2/D1 Oct. 2007, Section 6.3.22.2.

* cited by examiner

*Primary Examiner* — Kamran Afshar
*Assistant Examiner* — Mong-Thuy Tran (57) ABSTRACT

Various embodiments are described to address some of the inefficiencies in present-day network initiated handovers. A serving node (121) sends a first message requesting a remote unit (101) to handover but does not indicate any network nodes to which to handover and then receives, in response, a second message indicating a target node (e.g., 122) preferred for handover by the remote unit. The serving node then notifies the target node of a potential handover by the remote unit and sends a third message to indicate to the remote unit to proceed with a handover to the target node. By first obtaining a preferred handover target from the remote unit and then notifying that target node, a network initiated handover may be accomplished more efficiently than by using the known technique of notifying prospective nodes prior to obtaining any acceptance or preference from the remote unit.

26 Claims, 5 Drawing Sheets

METHOD AND APPARATUS FOR SUPPORTING A NETWORK INITIATED HANDOVER IN A WIRELESS NETWORK

REFERENCE(S) TO RELATED APPLICATION(S)

The present application claims priority from a provisional application Ser. No. 61/036,573, entitled "METHOD AND APPARATUS FOR SUPPORTING A NETWORK INITIATED HANDOVER IN A WIRELESS NETWORK," filed Mar. 14, 2008, which is commonly owned and incorporated herein by reference in its entirety.

This application is related to a co-pending application, Ser. No. 12/121,839 entitled "METHOD AND APPARATUS FOR SUPPORTING A CONTROLLED HANDOVER IN A WIRELESS NETWORK," filed May 16, 2008, which is assigned to the assignee of the present application.

FIELD OF THE INVENTION

The present invention relates generally to communication systems and, in particular, to supporting a network initiated handover in a wireless network.

BACKGROUND OF THE INVENTION

Network initiated handovers may occur to balance network load across multiple base stations (BSs) in the network, to perform maintenance (e.g., when a serving base station (SBS) needs to be removed from service for software or hardware upgrades), or for various other reasons. This is preferable from an operator and MS perspective for active calls. It is desirable for the selection of a target base station (TBS) for a mobile station (MS) to handover to depend on how well the MS is receiving signaling from that and other prospective TBSs. However, often the network doesn't have the most reliable information regarding the best handover target BS for an MS at a given instance of time.

A controlled handover in a WiMAX network refers to a handover where an MS hands off to a TBS which was previously notified and prepared by the serving BS (SBS) for an incoming handover by the MS. Controlled handovers in WiMAX and 802.16 based networks may be initiated by either the MS, SBS or Access Service Network (ASN) in response to deteriorating wireless conditions, network load balancing, network maintenance, etc. See e.g., IEEE 802.16Rev2/D2 section 6.3.22.2.2 and WiMAX Networking Specification Stage-3 Text R1.0 (v1.2), Section 4.7.2.

In a controlled handover, the network notifies prospective TBS candidates via handover preparation procedures so that they are prepared to receive a handover from the MS. Handover preparation of potential TBSs helps to reduce data loss during handover. It also enables the TBS to offer priority access to the MS when it contacts the TBS for handover, thereby reducing handover latency delays.

Handover preparation includes passing network context information such as the anchor authenticator ID, the anchor data path ID, and the latest MAC context information from the SBS to the TBSs. Handover preparation may also include the establishment of bearer connections between the TBS and network in order to continue the mobile's IP session.

In a network initiated controlled handover, the network proposes one or more candidate TBSs for an MS to handover to in the IEEE 802.16 MOB_BSHO-REQ message. See e.g., P802.16Rev2/D2 section 6.3.22.2 and WiMAX R1.2 Networking Specification Stage-3 Text, Section 4.7.2.1.6. The MS responds by sending a MOB_HO-IND message indicating its acceptance or rejection of the handover target BS(s) proposed by the serving BS. If the MS accepts a TBS proposed by the serving BS, it moves to the selected target BS and begins ranging to complete the handover. If the MS rejects the target BS(s) offered by the serving BS, it sets the T42 timer and waits for the SBS to propose an alternate TBS for the MS to handover to. This process repeats until an acceptable TBS for handover is offered by the serving BS or the T42 timer expires. See P802.16Rev2/D2 FIG. 150.

Figure 4:
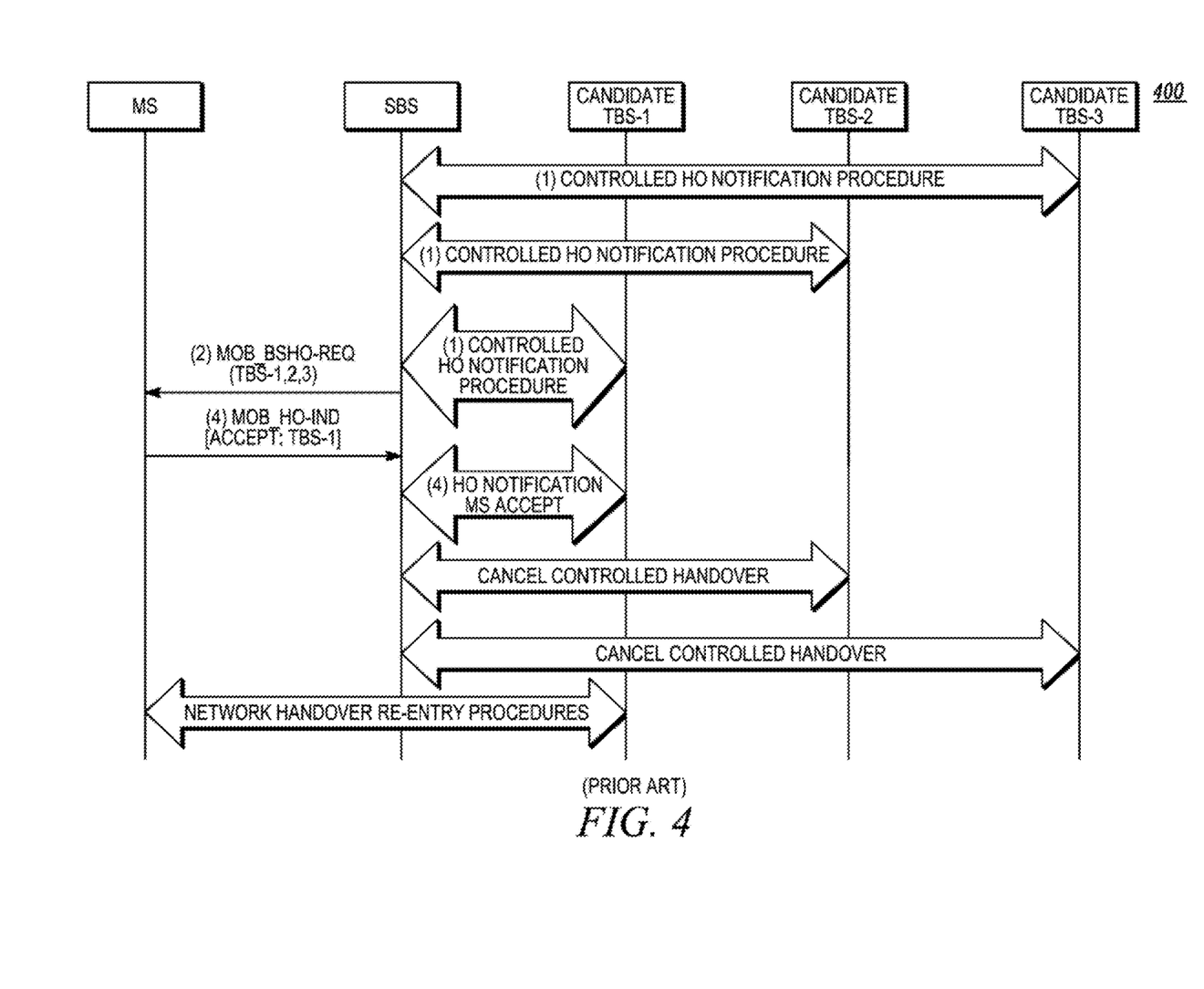
FIG. 4 is a signaling flow diagram that depicts a first example of a network initiated handover, in accordance with the prior art.

FIG. 4 is a signaling flow diagram that depicts a first example of a network initiated handover, in accordance with the prior art. The signaling flow of diagram 400 depicts a network initiated handover procedure for an 802.16 compliant MS similar to that described in NWG R1.0 v1.2 stage-3 section 4.7.2 and 4.7.2.1.6.

In diagram 400 the SBS notifies and prepares three candidate TBSs for the MS to handover to before requesting the MS to handover to one of them. The MS selects one of the candidate TBSs (candidate TBS-1) offered by the SBS. The TBSs that weren't selected (candidate TBS-2 and candidate TBS-3) by the MS are notified via network handover cancellation procedures. If the mobile rejects all the TBSs offered by the SBS for handover, the network not only has to notify the previous candidate TBSs prepared for the handover, but must also notify and prepare one or more new TBSs for a potential incoming handover from the MS. See e.g., IEEE 802.16 FIGS. 149 and 150.

As can be seen from diagram 400, handover preparation is expensive in terms of the network signaling required to notify prospective TBSs and allocating resources at these TBS to support a potential handover. After a TBS offered by the SBS is selected by the mobile, all of the other candidate TBSs previously notified and prepared for a potential handover, but then rejected, must be notified by the SBS. They are notified that they were not selected so that the resources they have allocated to support a potential handover may be released.

Figure 5:
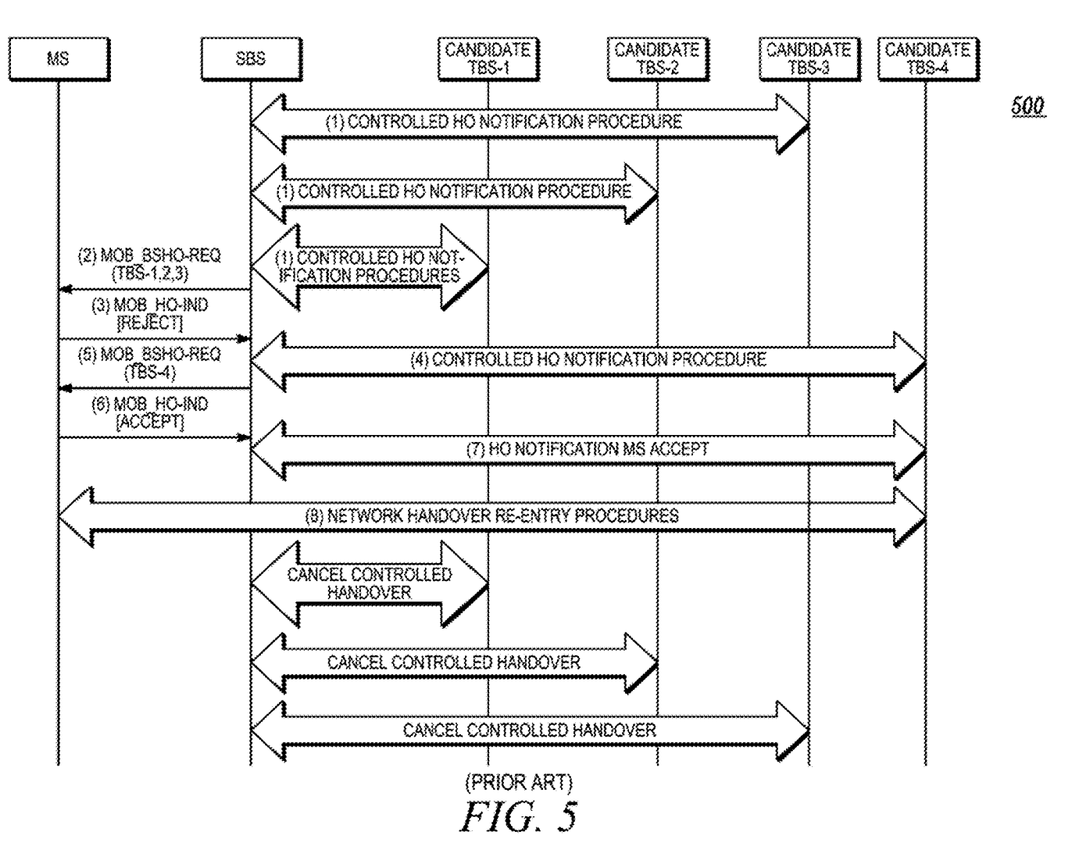
FIG. 5 is a signaling flow diagram that depicts a second example of a network initiated handover, in accordance with the prior art.

FIG. 5 is a signaling flow diagram that depicts a second example of a network initiated handover, in accordance with the prior art. The signaling flow of diagram 500 depicts network initiated handover procedures for an 802.16 compliant MS in which the mobile rejects all of the TBSs offered by the SBS. After the MS rejects the TBSs offered by the SBS, the SBS/ASN must come up with a new TBS to offer the MS. However, this requires guesswork on the part of the network. The example of diagram 500 shows the network offering candidate TBS-4 to the MS after candidate TBSs 1, 2 and 3 are rejected by the MS. In this example, the MS accepts candidate TBS-4; however, it could also have rejected candidate TBS-4 and continued rejecting candidate TBSs for awhile. Such a cycle of rejections may continue until the network eventually offers a candidate TBS acceptable to the MS or for some other reason the negotiation procedure ends. Neither of these are desirable outcomes, especially when the SBS/network is performing load balancing or the SBS is being taken out of service for some reason.

Thus, in view of the inefficiencies present in current network initiated handover techniques, new techniques that are able to improve network initiated handover are clearly desirable for advancing the art.

Specific embodiments of the present invention are disclosed below with reference to FIGS. 1-3. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved. In addition, although the signaling flow diagrams and/or the logic flow diagrams above are described and shown with reference to specific signaling exchanged and/or specific functionality performed in a specific order, some of the signaling/functionality may be omitted or some of the signaling/functionality may be combined, sub-divided, or reordered without departing from the scope of the claims. Thus, unless specifically indicated, the order and grouping of the signaling/functionality depicted is not a limitation of other embodiments that may lie within the scope of the claims.

Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

DETAILED DESCRIPTION OF EMBODIMENTS

Various embodiments are described to address some of the inefficiencies in present-day network initiated handovers. A serving node sends a first message requesting a remote unit to handover but does not indicate any network nodes to which to handover and then receives, in response, a second message indicating a target node preferred for handover by the remote unit. The serving node then notifies the target node of a potential handover by the remote unit and sends a third message to indicate to the remote unit to proceed with a handover to the target node. By first obtaining a preferred handover target from the remote unit and then notifying that target node, a network initiated handover may be accomplished more efficiently than by using the known technique of notifying prospective nodes prior to obtaining any acceptance or preference from the remote unit as part of the handover signaling protocol.

Figure 1:
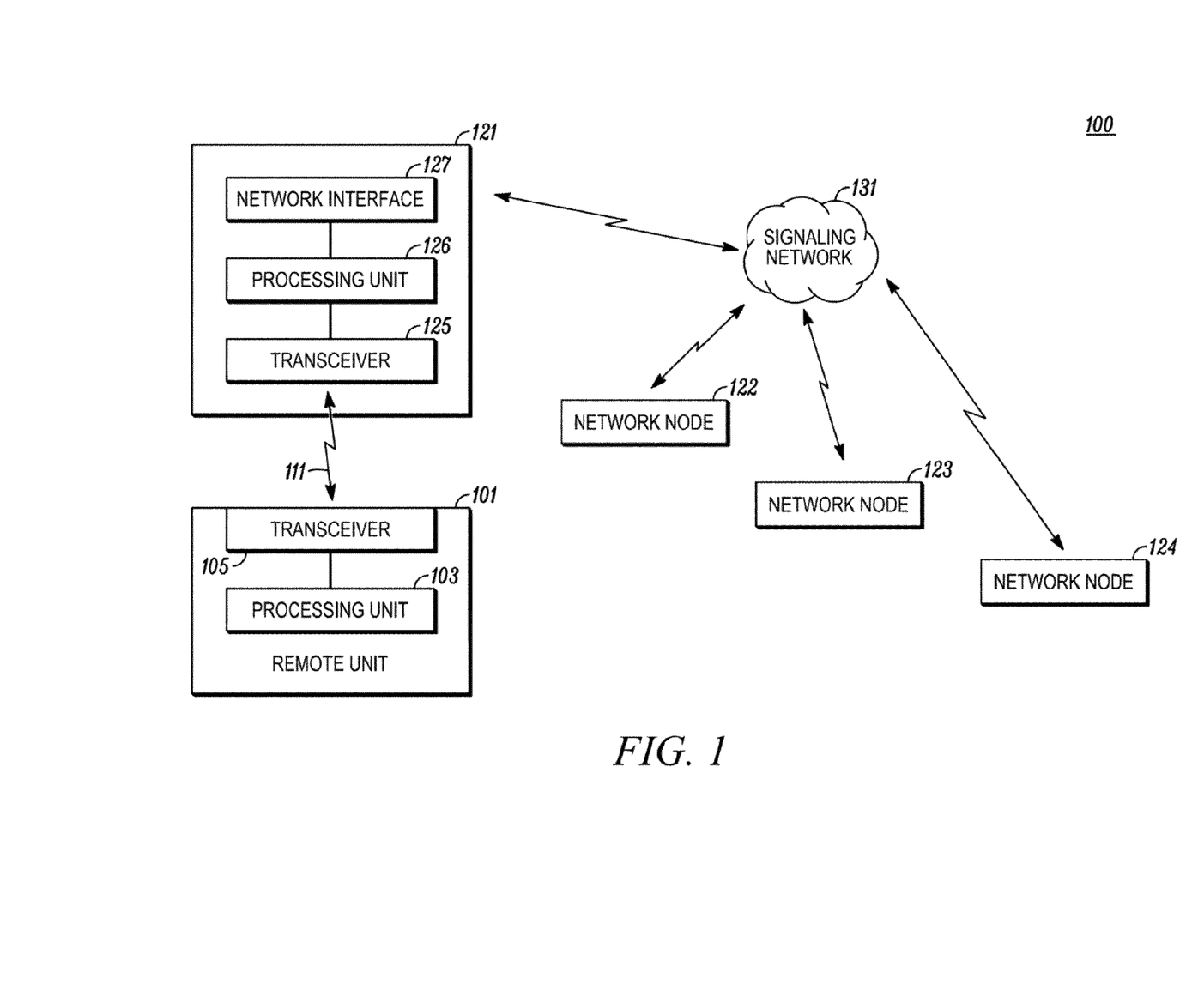
FIG. 1 is a block diagram depiction of a wireless communication system in accordance with multiple embodiments of the present invention.
Figure 2:
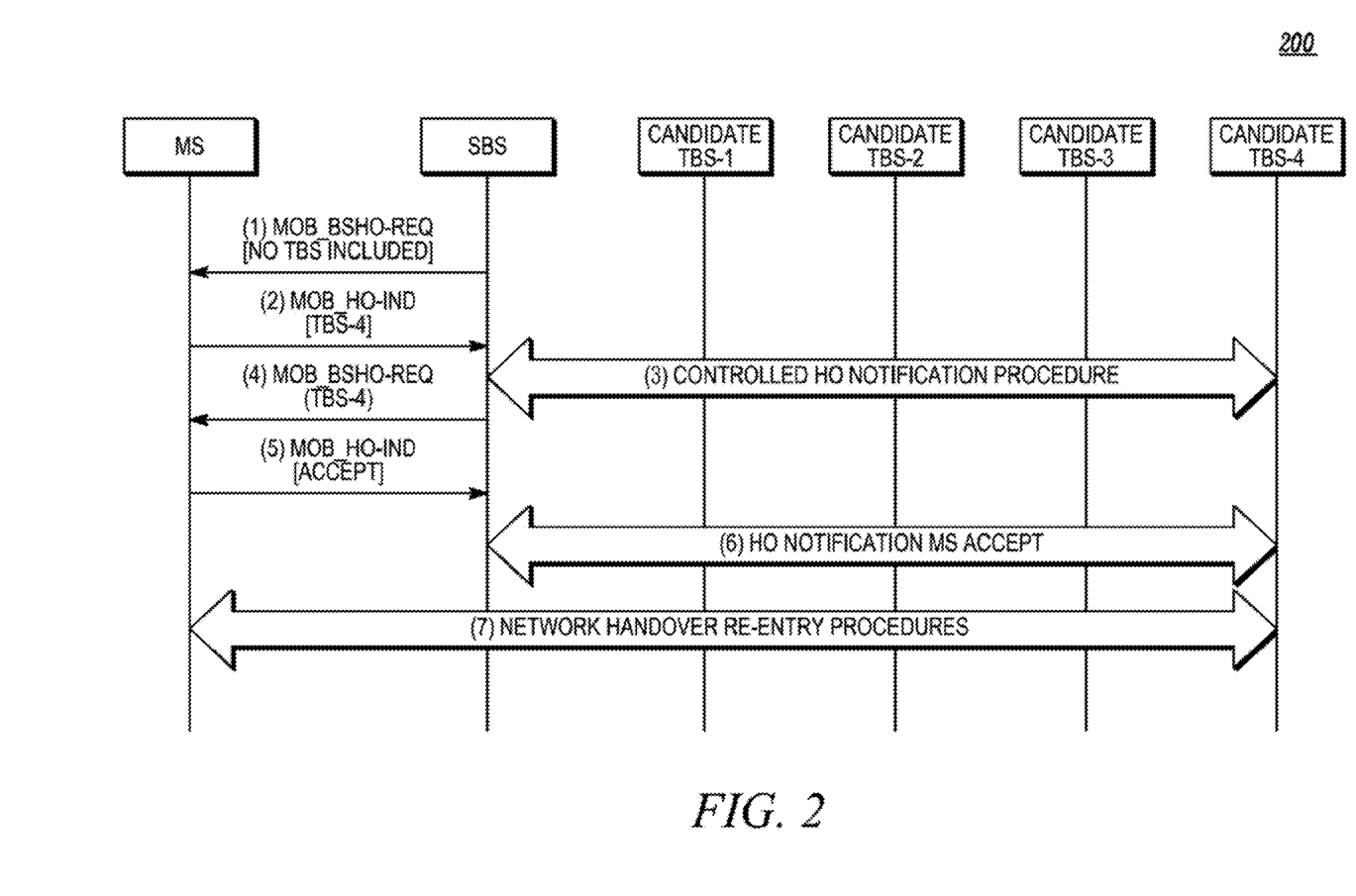
FIG. 2 is a signaling flow diagram that depicts a network initiated controlled handover, in accordance with some embodiments of the present invention.
Figure 3:
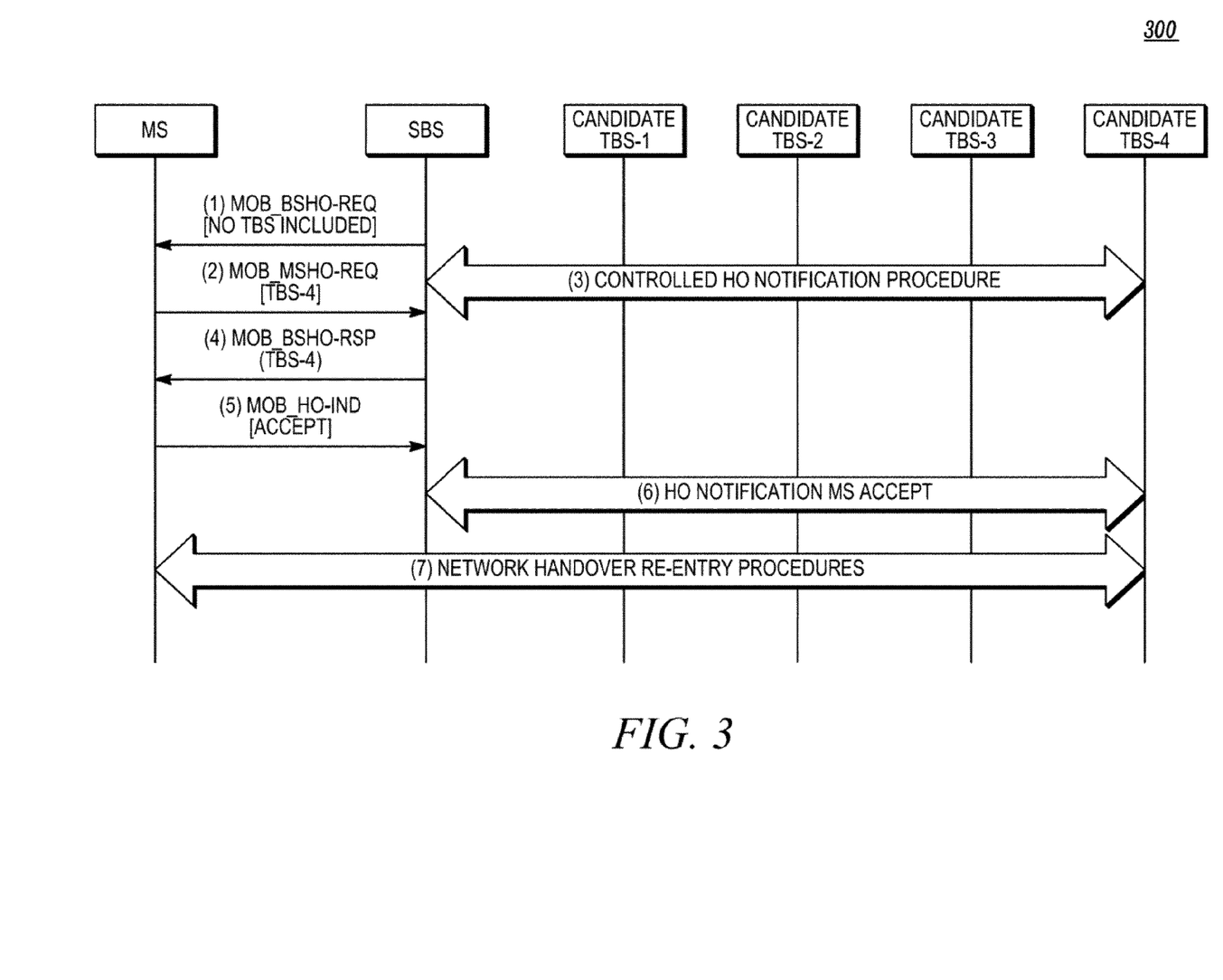
FIG. 3 is a signaling flow diagram that depicts a network initiated controlled handover, in accordance with other embodiments of the present invention.

The disclosed embodiments can be more fully understood with reference to FIGS. 1-3. FIG. 1 is a block diagram depiction of a wireless communication system 100 in accordance with multiple embodiments of the present invention. At present, standards bodies such as OMA (Open Mobile Alliance), 3GPP (3rd Generation Partnership Project), 3GPP2 (3rd Generation Partnership Project 2), IEEE (Institute of Electrical and Electronics Engineers) 802, and WiMAX Forum are developing standards specifications for wireless telecommunications systems. Communication system 100 represents a system having an architecture in accordance with one or more of the WiMAX Forum and/or IEEE 802 technologies, suitably modified to implement the present invention. Alternative embodiments of the present invention may be implemented in communication systems that employ other or additional technologies such as, but not limited to, those described in the OMA, 3GPP, and/or 3GPP2 specifications.

Communication system 100 is depicted in a very generalized manner. For example, system 100 is shown to simply include remote unit 101, network nodes 121-124 and signaling network 131. Network nodes 121-124 are shown having interconnectivity via signaling network 131. Network node 121 is shown providing network service to remote unit 101 using wireless interface 111. The wireless interface used is in accordance with the particular access technology supported by network node 121, such as one based on IEEE 802.16. Network nodes 121-124 may all utilize the same wireless access technology, or they may utilize different access technologies. Those skilled in the art will recognize that FIG. 1 does not depict all of the physical fixed network components that may be necessary for system 100 to operate but only those system components and logical entities particularly relevant to the description of embodiments herein.

For example, FIG. 1 does not depict that network nodes 122-124 each comprise processing units, network interfaces and transceivers. In general, components such as processing units, transceivers and network interfaces are well-known. For example, processing units are known to comprise basic components such as, but neither limited to nor necessarily requiring, microprocessors, microcontrollers, memory devices, application-specific integrated circuits (ASICs), and/or logic circuitry. Such components are typically adapted to implement algorithms and/or protocols that have been expressed using high-level design languages or descriptions, expressed using computer instructions, expressed using signaling flow diagrams, and/or expressed using logic flow diagrams.

Thus, given a high-level description, an algorithm, a logic flow, a messaging/signaling flow, and/or a protocol specification, those skilled in the art are aware of the many design and development techniques available to implement a processing unit that performs the given logic. Therefore, devices 121-124 represent known devices that have been adapted, in accordance with the description herein, to implement multiple embodiments of the present invention. Furthermore, those skilled in the art will recognize that aspects of the present invention may be implemented in or across various physical components and none are necessarily limited to single platform implementations. For example, a network node may be implemented in or across one or more RAN components, such as a base transceiver station (BTS) and/or a base station controller (BSC), a Node-B and/or a radio network controller (RNC), or an HRPD AN and/or PCF, or implemented in or across one or more access network (AN) components, such as an access service network (ASN) gateway and/or ASN base station (BS), an access point (AP), a wideband base station (WBS), and/or a WLAN (wireless local area network) station.

Remote unit 101 and network node 121 are shown communicating via technology-dependent, wireless interface 111. Remote units, subscriber stations (SSs) and/or user equipment (UEs), may be thought of as mobile stations (MSs), mobile subscriber stations (MSSs), mobile devices or mobile nodes (MNs). In addition, remote unit platforms are known to refer to a wide variety of consumer electronic platforms such as, but not limited to, mobile stations (MSs), access terminals (ATs), terminal equipment, mobile devices, gaming devices, personal computers, and personal digital assistants (PDAs). In particular, remote unit 101 comprises a processing unit (103) and transceiver (105). Depending on the embodiment, remote unit 101 may additionally comprise a keypad (not shown), a speaker (not shown), a microphone (not shown), and a display (not shown). Processing units, transceivers, keypads, speakers, microphones, and displays as used in remote units are all well-known in the art.

Operation of embodiments in accordance with the present invention occurs substantially as follows, first with reference to FIG. 1. As depicted in FIG. 1, network node 121 is the current serving node for remote unit 101. Desiring a network initiated handover, network node processing unit 126 sends via transceiver 125 a first message requesting remote unit 101 to handover. This first message may take the form of a handover request message, for example. Although the first message requests remote unit 101 to handover, it does not indicate any network nodes to which remote unit 101 may handover. Receiving this first message via remote unit transceiver 105, processing unit 103 determines one or more network nodes to which it would prefer to handover. In response to the first message, processing unit 103 then sends via transceiver 105 a second message indicating at least one target node that the remote unit prefers for handover. (For the sake of example, network node 122 will be assumed to be the target node preferred by remote unit 101.) Depending on the embodiment, this second message may take the form of a handoff acknowledgement message or a handoff request message, for example.

Receiving this second message via remote unit transceiver 125, processing unit 126 proceeds to notify target node 122, via network interface 127, of a potential handover by remote unit 101. In some embodiments, this notification may involve participating in a procedure to prepare target node 122 for a handover by remote unit 101. This procedure may take the form of passing certain network context information to support target node 122 in establishing bearer connections and preparing to continue the mobile's IP session after handover. Network context information may include authenticator IDs, foreign agent IDs (for mobile IP applications), an anchor data path ID, and the latest MS context information such as MAC context.

After notifying target node 122 and completing any procedures to prepare target node 122 for a handover by remote unit 101, processing unit 126 sends via transceiver 125 a third message indicating to remote unit 101 to proceed with a handover to target node 122. Depending on the embodiment, this third message may take the form of a handoff request message or a handoff response message. Receiving the third message, remote unit processing unit 103 may then accept handover to target node 122 by sending a fourth message to serving node 121 indicating its acceptance. This fourth message may take the form of a handoff acknowledgement message, for example. In response to receiving this fourth message, serving node processing unit 126 may then proceed to notify target node 122, via network interface 127, of the remote unit's handover acceptance.

As noted above, first obtaining a preferred handover target from the remote unit and then notifying that target node may accomplish a network initiated handover more efficiently than by present-day signaling techniques. As can be seen from diagrams 400 and 500, present-day handover preparation is expensive in terms of the network signaling that may be required to notify prospective target nodes and allocate resources at these nodes to support a potential handover. Only after these nodes are notified that they were not selected, do they release the resources they have allocated to support the potential handover. Various embodiments, as described above, enable networks to avoid inefficient handover scenarios such as these.

Reference has been made to IEEE 802.16 embodiments throughout. A brief summary that focuses on certain IEEE 802.16 embodiments appears below to provide some additional, and more particular examples. They are intended to further the reader's understanding of the variety of possible embodiments rather than to limit the scope of the invention.

FIG. 2 is a signaling flow diagram that depicts a network initiated controlled handover, in accordance with some embodiments of the present invention. In diagram 200, an IEEE 802.16 MOB_BSHO-REQ is sent by the SBS to the MS to initiate a handover. The network may include one or more candidate TBSs offered to the mobile for a handover. It may also not include any TBSs. Since network initiated handovers are not as time critical as some MS initiated handovers where wireless conditions may be deteriorating rapidly, the mobile and network typically have more time to identify a suitable target BS for the mobile and prepare for the handover.

In order to minimize air interface signaling, network signaling, and handover candidate TBS resources that are required to support a network initiated handover, the network initiates handover by sending IEEE 802.16 MOB_BSHO-REQ from the SBS to the MS with no proposed target BSs. The network does not notify or initiate handover preparation procedures with any TBS for MS handover. The MS responds to the MOB_BSHO-REQ message, which proposes no TBSs, with an 802.16 MOB_HO-IND message. The MS includes its preferred TBS for handover in this message.

Upon reception of this message from the mobile, the network initiates handover notification and preparation procedures with the MS selected TBS. No other TBSs are notified and prepared thereby minimizing network signaling and network resources. Upon completion of handover notification and preparation of the MS preferred target BS, the SBS notifies the MS to proceed with the handover by sending a new MOB_BSHO-REQ message to the MS with the MS preferred target BS proposed in the message (and no others).

The MS now sends a MOB_HO-IND message accepting the handover and the TBS offered to it (its own preferred TBS) and proceeds to initiate a handover at the TBS via an 802.16 ranging procedure. Since the TBS was previously notified by the SBS of an incoming handover from the MS, it is prepared to accept the MS. Furthermore, since no other candidate TBSs were notified or prepared of an incoming handover except the TBS selected by the mobile, no candidate TBSs need to be notified of handover preparation cancellation.

FIG. 3 is a signaling flow diagram that depicts a network initiated controlled handover, in accordance with other embodiments of the present invention. In diagram 300, reception of a MOB_BSHO-REQ message with no handover TBS included in the message, triggers the MS to initiate a handover by sending a MOB_MSHO-REQ message with its preferred TBS in the message. Upon reception of this message from the mobile, the network initiates handover notification and preparation procedures with the MS selected TBS. No other TBSs are notified and prepared thereby minimizing network signaling and network resources. Upon completion of handover notification and preparation of the MS preferred target BS, the SBS notifies the MS to proceed with the handover by sending a MOB_BSHO-RSP message to the MS with the MS preferred target BS proposed in the message (and no others).

The MS now sends a MOB_HO-IND message accepting the handover and the TBS offered to it (its own preferred TBS) and proceeds to initiate a handover at the TBS via an 802.16 ranging procedure to signal network reentry. Since the TBS was previously notified by the SBS of an incoming handover from the MS, it is prepared to accept the MS. Furthermore, since no other candidate TBSs were notified or prepared of an incoming handover except the TBS selected by the mobile, no candidate TBSs need to be notified of handover preparation cancellation.

One of skill in the art will appreciate that various modifications and changes may be made to the specific embodiments described above with respect to FIGS. 1-3 without departing from the spirit and scope of the present invention. Thus, the discussion of certain embodiments in greater detail above is to be regarded as illustrative and exemplary rather than restrictive or all-encompassing, and all such modifications to the specific embodiments described above are intended to be included within the scope of the present invention.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two. The term another, as used herein, is defined as at least a second or more. Unless otherwise indicated herein, the use of relational terms, if any, such as first and second, and the like, are used solely to distinguish one entity or action from another entity or action without necessarily requiring or implying any actual such relationship or order between such entities or actions.

The terms including and/or having, as used herein, are defined as comprising (i.e., open language). The term coupled, as used herein, is defined as connected, although not necessarily directly, and not necessarily mechanically. Terminology derived from the word "indicating" (e.g., "indicates" and "indication") is intended to encompass all the various techniques available for communicating or referencing the information or object being indicated. Some, but not all examples of techniques available for communicating or referencing the information or object being indicated include the conveyance of the information or object being indicated, the conveyance of an identifier of the information or object being indicated, the conveyance of information used to generate the information or object being indicated, the conveyance of some part or portion of the information or object being indicated, the conveyance of some derivation of the information or object being indicated, and the conveyance of some symbol representing the information or object being indicated. The terms program, computer program, and computer instructions, as used herein, are defined as a sequence of instructions designed for execution on a computer system. This sequence of instructions may include, but is not limited to, a subroutine, a function, a procedure, an object method, an object implementation, an executable application, an applet, a servlet, a shared library/dynamic load library, a source code, an object code and/or an assembly code.

What is claimed is:

1. A method for supporting a network initiated handover in a wireless network comprising:
    sending, by a serving base station, a first message requesting a remote unit to handover but not indicating any network nodes to which to handover, wherein the first message causes the remote unit to determine at least one target node preferred for handover by the remote unit;
    receiving, by the serving base station in response to the first message, a second message indicating a target node preferred for handover by the remote unit;
    notifying the target node by the serving base station of a potential handover by the remote unit, in response to receiving the second message;
    sending, by the serving base station, a third message indicating to the remote unit to proceed with a handover to the target node.

2. The method of claim 1, wherein the first message comprises a handover request message.

3. The method of claim 2, wherein the first message comprises a MOB_BSHO-REQ message.

4. The method of claim 1, wherein the second message comprises one of a handoff acknowledgement message or a handoff request message.

5. The method of claim 4, wherein the handoff acknowledgement message comprises a MOB_HO-IND message and the handoff request message comprises a MOB_MSHO-REQ message.

6. The method of claim 1, wherein notifying the target node of a potential handover by the remote unit comprises
    participating in a procedure to prepare the target node for a handover by the remote unit.

7. The method of claim 6, wherein sending the third message indicating to the remote unit to proceed with the handover to the target node comprises
    sending the third message after completing the procedure to prepare the target node for the handover by the remote unit.

8. The method of claim 1, wherein the third message comprises one of a handoff request message or a handoff response message.

9. The method of claim 8, wherein the handoff request message comprises a MOB_BSHO-REQ message and the handoff response message comprises a MOB_BSHO-RSP message.

10. The method of claim 1, wherein the third message comprises an identifier of the target node.

11. The method of claim 1, further comprising
    receiving, by the serving base station, a fourth message indicating acceptance of the handover to the target node by the remote unit;
    notifying the target node of the acceptance of the handover to the target node by the remote unit, in response to receiving the fourth message.

12. The method of claim 11, wherein the fourth message comprises an MOB_HO-IND message.

13. A method for supporting a network initiated handover in a wireless network comprising:
    receiving, by a remote unit from a serving base station, a first message requesting the remote unit to handover but not indicating any network nodes to which to handover, wherein the first message causes the remote unit to determine at least one target node preferred for handover by the remote unit;

sending, by the remote unit in response to the first message, a second message indicating a target node preferred for handover by the remote unit;

receiving, by a remote unit from the serving base station, a third message indicating to the remote unit to proceed with a handover to the target node.

14. The method of claim 13, wherein the first message comprises a handover request message.

15. The method of claim 14, wherein the first message comprises a MOB_BSHO-REQ message.

16. The method of claim 13, wherein the second message comprises one of a handoff acknowledgement message or a handoff request message.

17. The method of claim 16, wherein the handoff acknowledgement message comprises a MOB_HO-IND message and the handoff request message comprises a MOB_MSHO-REQ message.

18. The method of claim 13, wherein the third message comprises one of a handoff request message or a handoff response message.

19. The method of claim 18, wherein the handoff request message comprises a MOB_BSHO-REQ message and the handoff response message comprises a MOB_BSHO-RSP message.

20. The method of claim 13, wherein the third message comprises an identifier of the target node.

21. The method of claim 13, further comprising
sending, by the remote unit, a fourth message indicating acceptance of the handover to the target node.

22. The method of claim 21, wherein the fourth message comprises an MOB_HO-IND message.

23. A base station comprising:
a transceiver;
a network interface;
a processing unit, communicatively coupled to the transceiver and the network interface,
adapted to send, via the transceiver, a first message requesting a remote unit to handover but not indicating any network nodes to which to handover, wherein the first message causes the remote unit to determine at least one target node preferred for handover by the remote unit,
adapted to receive, from the remote unit via the transceiver in response to the first message, a second message indicating a target node preferred for handover by the remote unit,
adapted to notify the target node, via the network interface, of a potential handover by the remote unit, in response to receiving the second message, and
adapted to send, to the remote unit via the transceiver, a third message indicating to the remote unit to proceed with a handover to the target node.

24. The method of claim 23, wherein the processing unit is further
adapted to receive, from the remote unit via the transceiver, a fourth message indicating acceptance of the handover to the target node by the remote unit and
adapted to notify the target node, via the network interface, of the acceptance of the handover to the target node by the remote unit, in response to receiving the fourth message.

25. A remote unit comprising:
a transceiver;
a processing unit, communicatively coupled to the transceiver,
adapted to receive, from a serving base station via the transceiver, a first message requesting the remote unit to handover but not indicating any network nodes to which to handover, wherein the first message causes the remote unit to determine at least one target node preferred for handover by the remote unit,
adapted to send, via the transceiver and in response to the first message, a second message indicating a target node preferred for handover by the remote unit, and
adapted to receive, from the serving base station via the transceiver, a third message indicating to the remote unit to proceed with a handover to the target node.

26. The method of claim 25, wherein the processing unit is further
adapted to send, via the transceiver, a fourth message indicating acceptance of the handover to the target node.

* * * * *